United States Patent [19]

Stankoff

[11] 4,091,322
[45] May 23, 1978

[54] EDDY CURRENT GENERATING TYPE METAL PIPELINE DETECTOR

[75] Inventor: Alain Stankoff, Clamart, France

[73] Assignee: Societe Intersub Developpement, Rungis Cedex, France

[21] Appl. No.: 792,659

[22] Filed: May 2, 1977

[30] Foreign Application Priority Data

May 24, 1976 France .................................. 76 15679

[51] Int. Cl.$^2$ ........................ G01V 3/10; G01R 33/02
[52] U.S. Cl. ............................................ 324/3; 324/67
[58] Field of Search .................... 324/3, 6, 37, 40, 52, 324/67

[56] References Cited

U.S. PATENT DOCUMENTS

| 3,052,837 | 9/1962 | Arbogast et al. | 324/3 |
| 3,271,664 | 9/1966 | Mountz et al. | 324/40 |
| 3,338,059 | 8/1967 | Tittle | 324/3 X |
| 3,418,572 | 12/1968 | Humphreys | 324/3 |
| 3,907,136 | 9/1975 | Christides et al. | 324/67 X |

FOREIGN PATENT DOCUMENTS

| 960,966 | 4/1950 | France | 324/6 |
| 80,629 | 6/1934 | Sweden | 324/52 |
| 504,988 | 2/1976 | U.S.S.R. | 324/52 |

Primary Examiner—Gerard R. Strecker
Attorney, Agent, or Firm—Marn & Jangarathis

[57] ABSTRACT

A metal pipeline detector is described in which a generator generates a magnetic field. The magnetic field couples the metal pipeline when the detector is located in the vicinity thereof, and as a result eddy currents are induced in the pipeline. Detector coils are arranged to be coupled by the magnetic field produced by the eddy currents but not by the magnetic field generated by the generator. The detector coils are spaced apart so that the magnitude of the field coupled in each coil is representative of the distance between the pipeline and the coil. Electrical processing circuitry acts to detect the difference between the magnetic field coupled in each coil so as to determine the degree of which the detector is displaced from the optimum path for tracking the pipeline. In addition the processing means acts in response to the outputs of the detector coils to provide an indication of the distance of the pipeline to the detector.

14 Claims, 8 Drawing Figures

EDDY CURRENT GENERATING TYPE METAL PIPELINE DETECTOR

BACKGROUND OF THE INVENTION

1. Field of the Invention

The present invention relates to metal detectors for use in tracking buried or submerged cables and pipelines for example.

2. Description of the prior art

Tracking of underwater pipelines is known. In particular, it has been proposed to generate a magnetic field which couples with the pipeline and to use a detector coil for detecting the magnetic field produced by eddy currents induced in the pipeline by the generated magnetic field. The disadvantage of this system is that it is not sufficiently sensitive to enable an optimum tracking path to be followed. It is an object of the invention to provide an improved detector. It is a further object of the invention to provide a detector which overcomes the disadvantage of the previously proposed detector.

SUMMARY OF THE INVENTION

According to the invention there is provided a metal detector, comprising a framework having two spaced reference points, first and second measuring devices mounted on the framework and each arranged to sense the distance between a metal object to be detected and a corresponding one of the two reference points, each measuring device comprising a transmitter having at least two substantially coplanar pole faces of opposite magnetic polarities for generating an alternating primary magnetic field to couple the metal object to be detected, and a receiver including at least one detecting coil having a longitudinal axis which extends parallel to the common plane containing the said two pole faces, the detecting coil being coupled by a secondary magnetic field generated by eddy currents induced in the metal object by the primary magnetic field, to produce an output signal indicative of the magnitude of the field detected, and processing means comprising a substractor coupled to receive the output signal of each receiver and to produce a difference signal indicative of a deviation of the detector from the metal object, and means providing an auxiliary signal representative of the magnitude of the secondary magnetic field at a point intermediate the two reference points.

According to the invention there is further provided a metal detector comprising a frame, magnetic transmitter means mounted on the frame and having two coplanar pole faces of opposite polarity for generating an alternating magnetic field arranged to couple a metal object to be detected, first, second and third detecting coils mounted on the frame and having longitudinal axes located in a common plane extending parallel to the plane common to the two pole faces, the axes of the first and second detecting coils lying parallel to, equidistant from, and on opposite sides of the axis of the third coil, the centers of the three coils lying along a common axis which extends at right angles to the axis common to the centers of the two pole faces, the three coils being arranged to sense magnetic fields produced by eddy currents induced in the metal object by the magnetic transmitter means, means coupling the first and second coils in series-opposition to provide an output signal indicative of any misalignment between the detector and the metal object being detected, means for receiving the output of the third coil, which output is indicative of the distance of the detector from the object, and for modifying the said output signal substantially to remove from it the component which varies with distance of the detector from the metal object, the modified output signal thereby being directly proportional to the deviation of the detector from the metal object along the axis common to the centers of the detecting coils.

BRIEF DESCRIPTION OF THE DRAWINGS

A metal detector embodying the invention will now be described, by way of example, with reference to the accompanying drawings in which.

DESCRIPTION OF THE PREFERRED EMBODIMENTS

Figure 1:
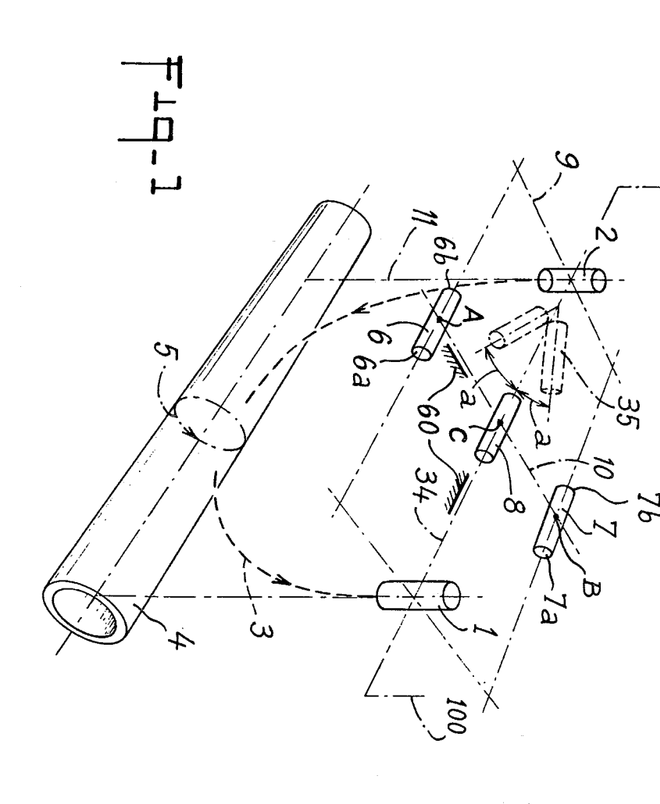
FIG. 1 is a perspective view illustrating the relative positions of transmitting and detecting coils of one form of metal detector embodying the invention used to track an undersea pipeline.

As shown in FIG. 1, the metal detector has two transmitting coils 1 and 2, arranged with their axes vertical and supplied with alternating current in such a sense as to generate a primary circular magnetic field 3 extending in a vertical plane 100 containing the axes of the two coils 1 and 2. This primary field will induce eddy currents 5 in any metal element such as a buried undersea pipeline 4 which it traverses. For this to occur, the metal element must be located directly below the transmitting coils with the vertical plane 11 containing the longitudinal axis of the pipeline coinciding with the vertical plane 100 of the detector. The induced eddy currents for their part will generate a secondary field tending to cancel the primary field. This secondary field is detected by three receiving or detecting coils 6, 7 and 8 arranged so that their axes are parallel but spaced from one another and lie in a common horizontal plane 9; the plane 9 intersects the centers of the transmitting coils 1 and 2. The centers of the detecting coils 6, 7 and 8 advantageously lie along a common horizontal axes 10 which is located equidistant from the two coils 1 and 2 and extends at right angles to the vertical plane 11 containing the axis of the pipeline 4.

This particular arrangement of the receiving coils is such that the primary magnetic field has little or no effect on these coils.

The outermost two of the detecting coils 6 and 7 are connected in series opposition, that is to say when the two coils are coupled by the same magnetic field they generate signals of equal amplitude but of opposite polarity. The two series connected coils 6 and 7 form a pickup to provide an output which after synchronous demodulation provides a signal 12 having an amplitude which varies (see FIG. 7) as a function of the position x of the detector along the transverse axis 10. This signal has a positive maximum amplitude when the center of the detector (this being the center of the coil 8) is located at a point A on the axis 10 and a negative maximum amplitude when the center of the detector is located at a point B on the axis 10. The points A and B correspond to positions occupied by the centers of the respective coils 7 and 8 when the center of the detector is located in the vertical plane 11 containing the axis of the pipeline.

The signal 12 is neutralised or zero when the coils 6 and 7 lie equidistant from the vertical plane 11 containing the axis of the pipeline 4.

The value of the maximum amplitude of the signal 12 depends largely on the distance between the horizontal plane 9 of the detector and the pipeline 4. The purpose of the central detecting coil 8 is to provide a control signal having an amplitude which varies with distance between the plane 9 and the pipeline 4. This control signal is a maximum when the center of the detector lies in the vertical plane 11 of the pipeline. With this control signal it is possible to eliminate the effect of distance between the device and the pipeline 4 from the signal 12. Also the control signal supplied by the central coil 8 provides a measure of this distance.

Figures 3, 3A:
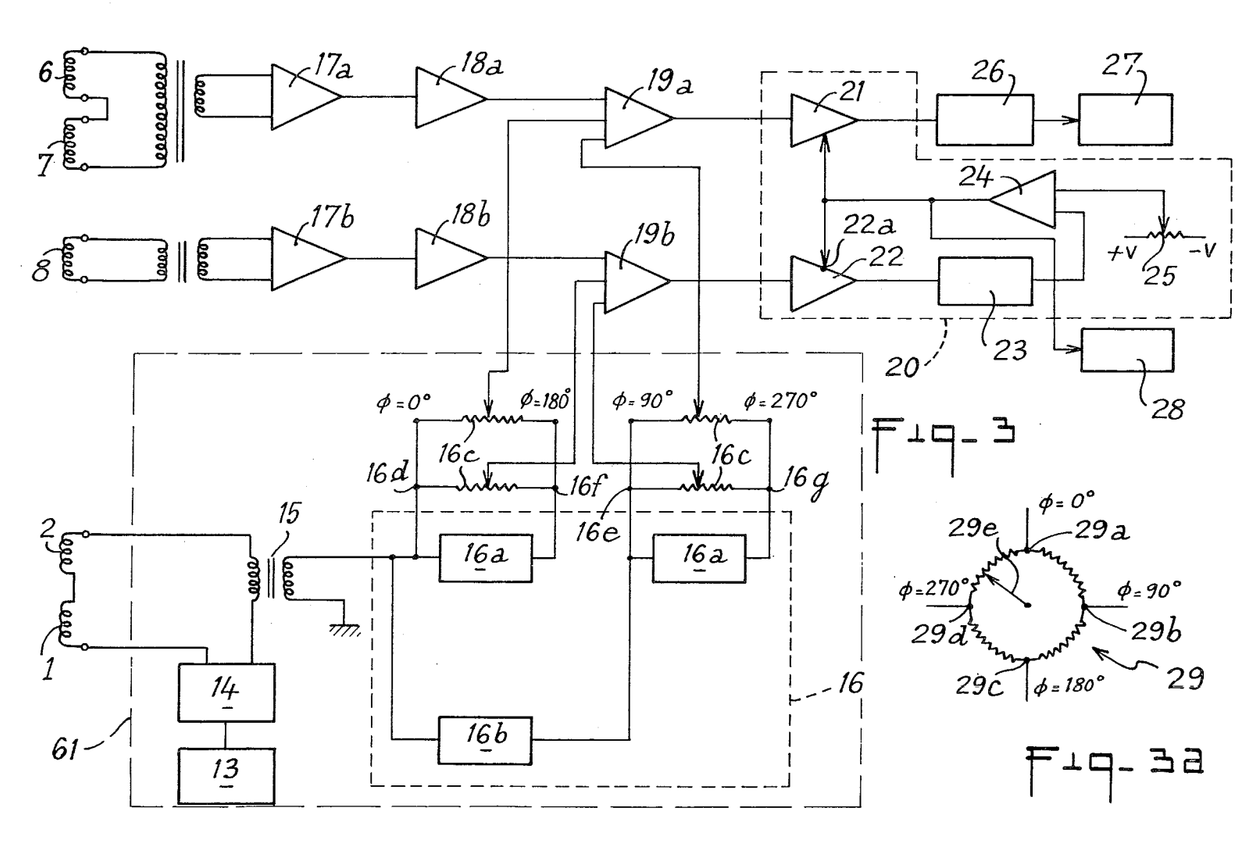
FIG. 3 is a block diagram of the detector of FIG. 1.
FIG. 3a is a circuit diagram of a phase adjustment potentiometer for use in conjunction with the electronic circuit of FIG. 3.

FIG. 3 is the circuit of the detector which shows how signals are applied to feed the transmitting coils 1 and 2 and how the signals derived by the detecting coils 6, 7 and 8 are processed.

As shown in FIG. 3, an oscillator 13 generates an AC output which is amplified by a power amplifier 14 and fed to the coils 1 and 2 which are connected in series. A part of the power supplied by the amplifier 14 is picked up by a current transformer 15 and fed to a reference device 16 providing four reference signals respectively phased-displaced by 0°, 90°, 180° and 270° with respect to the phase of the current flowing through the transmitting coils 1 and 2. These reference signals make it possible to cancel out any undesirable synchronous components picked up by the receivers 6, 7 and 8. They also enable adjustment of the phase of the signal controlling the actuation of two synchronous detectors 23 and 26 to be described in more detail hereinafter.

To this end, the reference device 16 includes two inverters 16a, each producing a phase shift of 180°, and a phase converter 16b producing a phase shift of 90°. Two parallel-connected tapped resistors 16c are connected across one of the inverters 16a so that the tapped output of each resistor produces an in-phase output signal which can be varied in amplitude and reversed in phase. Two parallel-connected tapped resistors 16c are connected across the other of the inverters 16a so that the tapped output of each resistor 16c produces a quadrature output which can be varied in amplitude and reversed in phase.

The signals retransmitted by the pipeline 4 being tracked are picked up by the detecting coils 6, 7 and 8. The resulting differential signal produced by the series-connected coils 6 and 7 is coupled by a transformer to the input of a pre-amplifier 17a. The output of pre-amplifier 17a is fed to an amplifying stage 18a and thence to a summing circuit 19a which is supplied with reference signals from the reference circuit 16. The amplitudes of the reference signals are adjusted so that when they are algebraically summed with the differential signal they eliminate undesirable components in the differential signal originating from stationary metal parts situated close to the detector, or from a mechanical breakdown of this latter. In a similar manner, the output of coil 8 is fed via a transformer to a pre-amplifier 17b and then to a summing circuit 19b via an amplifying stage 18b. Undesirable components in the amplified output of the coil 8 are eliminated by reference signals from the reference device 16 in a similar manner to that described in conjunction with the differential signal.

The signals delivered by the summing circuits 19a and 19b are then combined in an output circuit 20 in such manner as to provide a quantitative reading of the lateral displacement along the axis 10 between the pipeline 4 and the center of the detector, and also an estimate of the distance separating the pipeline 4 from the detector.

The output circuit 20 acts to multiply the processed differential signal derived from the summing circuit 19 by a signal having an amplitude which is a function of the reciprocal of the signal produced by the circuit 19b. The output signals of the circuit 19a on the one hand, and of the circuit 19b on the other hand, each act on an identical variable gain amplifier 21,22. The output of the amplifier 22 is demodulated in a synchronous detector 23 and fed back to the gain control terminal 22a of the amplifier 22 after passage through a comparator 24. The amplitude of the output signal of the amplifier 22 is thus kept constant by this feedback at a level depending on the reference voltage of the comparator 24 supplied by an adjustable DC source 25. The gain control voltage of the amplifier 22 is fed to the gain control terminal 21a of the amplifier 21. This control voltage is consequently such that it corresponds to a gain of the amplifiers 21 and 22 which is inversely proportional to the peak input voltage of the amplifier 22.

The signal issuing from the amplifier 21 is thus a balanced alternating signal having an amplitude which is the quotient of the amplitude of the signal acting on the amplifier 21 divided by the amplitude of the signal acting on the amplifier 22. After demodulation in a synchronous detector 26, the amplitude of this balanced signal provides a quantitative reading corresponding to the horizontal lateral displacement of the detector with respect to the pipeline 4, this reading being substantially independent (to within first order figures at least) of the distance of the detector from the pipeline. This reading is displayed by a position indicator device 27. The distance of the detector from the metal object is deduced from the voltage controlling the gain of the amplifiers 21 and 22. This distance is displayed by a depth indicator 28.

The synchronous detectors 23 and 26 are controlled by a signal having the same frequency as that of the oscillator 13, but having a phase which is controlled by means of a loop potentiometer 29, see FIG. 3a. The loop potentiometer has four input points 29a, 29b, 29c and 29d respectively connected to the points 16d, 16e, 16f and 16g of the tapped resistors 16c of the device 16. The slider 29e of the loop potentiometer 29 is connected to the control terminal of each of the two synchronous detectors 23 and 26.

Figure 4:
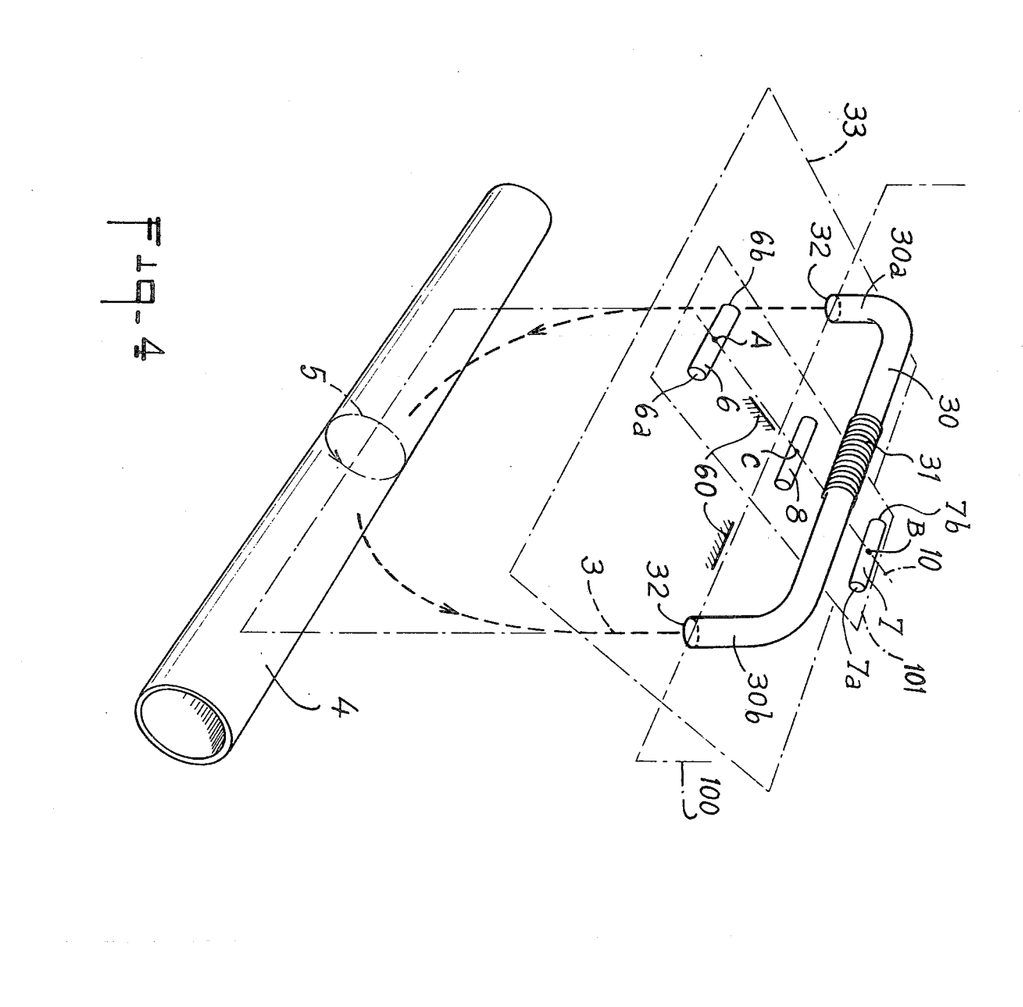
FIG. 4 is a perspective view showing the transmitting and receiving coils of another form of metal detector embodying the invention used to track an undersea pipeline.

In the metal detector shown in FIG. 4, a single transmission coil 31 is wound on an inverted U-shaped ferromagnetic armature 30; the two legs 30a and 30b of the armature 30 are axially parallel and lie spaced from one another. Each leg has an end face 32 lying in a common horizontal plane 33 and facing towards the pipeline 4.

Three equispaced and parallel detecting coils 6, 7 and 8 have axes which lie in a common horizontal plane 101 spaced from the horizontal plane 33 in the direction of the base of the inverted U-shaped armature 30. In this way, the primary field 3 has little or no effect on the detecting coils 6, 7 and 8. As in the case of FIG. 1, the axis of the central coil 8 is situated in a plane 100 extending at right angles to the axis 10 passing through the centers of the coilts 6 and 7. This plane 100 also contains the axes of the legs 30a and 30b of the armature 30. The outputs of the coils 6, 7 and 8 are processed in a similar manner to that described in conjunction with FIGS. 3 and 3a.

In a modification (not illustrated) the detector includes in addition to the coils 1 and 2 one or more pairs of complementary transmitting coils, the coils of the or each pair having a lesser mutual spacing than that of the coils 1 and 2. The complementary coils are arranged to provide corrective magnetic field opposite in direction to and having a lesser spatial extension than, that of the field generated by the transmitting coils 1 and 2. In this way the spatial variation of the primary magnetic field at the level of the detecting coils is reduced. Thus a mechanical deformation of the detector will consequently produce a lesser drift of the residual alternating voltage picked up by the detecting coils.

The weight and bulk of the detector can be reduced by installing magnetic cores in these coils 1, 2, 6, 7 and 8 to enable a reduction in the coil diameters.

In another modification the long-distance response of the detector is improved by the addition of a complementary pair of coils having a lesser mutual spacing than that of the coils 6 and 7.

To eliminate the influence of fixed metal masses situated close to the detector magnetic screens (not shown) are provided for insulating the detector with respect to the magnetic masses which are close by.

The signal derived from the coil 8, which is indicative of the distance separating the detector from the metal object sought, is advantageously processed by a digital or non-digital calculator or processor circuitry to provide a more accurate and precise distance measurement.

The angle between the axis of the pipeline 4 and the longitudinal axis 34 (the axis of the coil 8) of the detector, can be evaluated with the aid of a pair of mutually inclined detector coils 35 (shown in broken lines in FIG. 1) located on opposite sides of the axis 34 and each making an angle $a°$ with respect to the axis 34. The axes of these detector coils 35 lie in the common plane 9. A processing circuit (not shown) is arranged to compare the amplitude of the outputs from the two detecting coils and to provide an indication of the angle between the plane 11 of the pipeline and the axis 34.

In another modification (not shown), the coils 1 and 2 are supplied with two signals of different frequencies. The selective amplifiers 18a and 18b are then selected in such manner that each of the amplifies, respectively, only signals having the one or the other of these frequencies. With this arrangement, the circuit 20 of FIG. 3 can be modified to use only a single variable gain amplifier instead of two.

Figure 5:
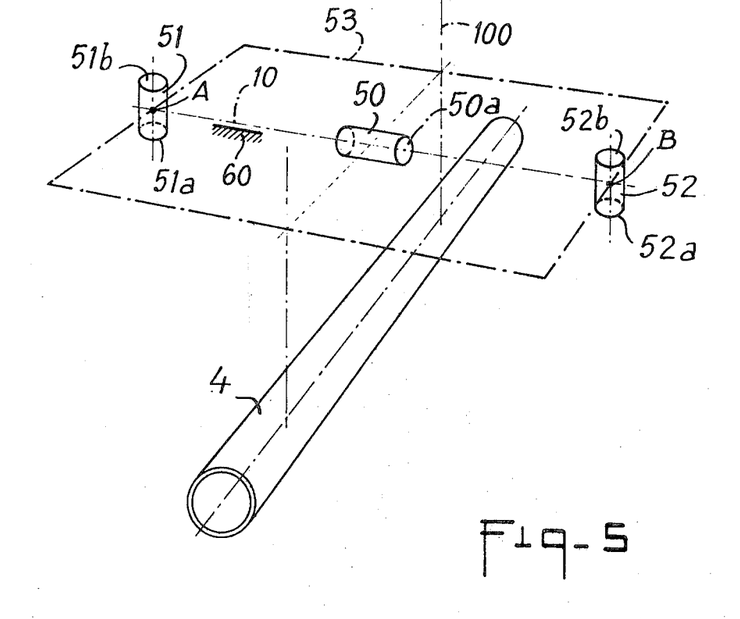
FIG. 5 is a view showing the transmitting and receiving coils of yet another form of detector embodying the invention used to track an undersea pipeline.
Figure 6:
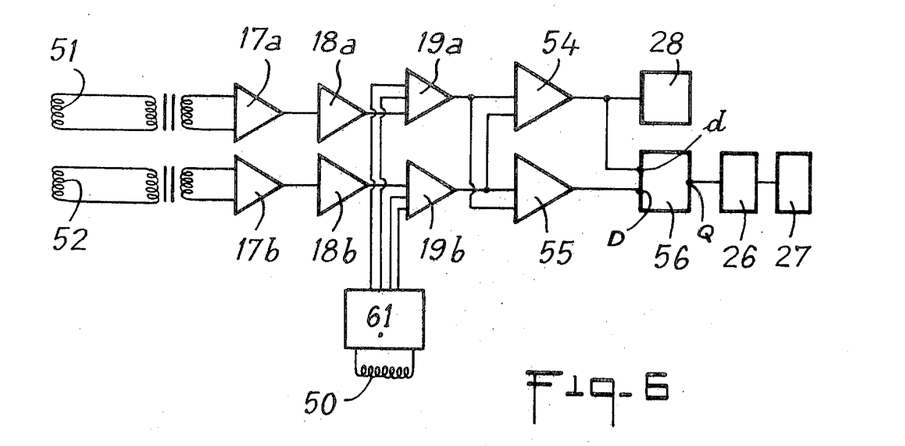
FIG. 6 is a block diagram of the detector of FIG. 5.

In the form of the detector shown in FIGS. 5 and 6, there is just a single transmitting coil 50 having a horizontal axis. Two detecting coils 51, 52 each having a vertical axis, are positioned at opposite ends of the coil 50 with their axes intersected by the axis 50a of the coil 50. The centers of coils 51 and 52 lie equidistant from the center of the coil 50 and lie in a common plane 53 with the axis 50a of the coil 50. In the optimum detection position, the coil 50 is at right angles to the pipeline 4 which is to be detected, as illustrated in FIG. 5.

It will be appreciated that the receiving coils are situated substantially at the same level as the transmitting polar extremities of the transmitting coils. In the case of FIG. 1, this level is that of the common plane containing the centers of the transmitting coils 1 and 2. In the case of FIG. 5, this level is that of the horizontal plane 53 containing the axis 50a.

FIG. 6 is the circuit of the detector of FIG. 5. Parts in FIG. 6 similar to those in FIG. 3 are similarly referenced. In FIG. 6, since there are only two detecting coils 51 and 52 each one is coupled through a respective transformer to a corresponding one of two pre-amplifiers 17a and 17b.

The outputs of the two summing circuits 19a and 19b are added together by an adder 54 and subtracted one from the other by a subtractor. The sum produced by the adder gives a signal indicative of the distance of the detector from the pipeline and this signal is fed to a depth indicator 28.

The result of the subtraction performed by the subtractor 55 is fed to the "dividend" input terminal D of a dividing circuit 56. The "divisor" input terminal $d$ of the circuit 56 is connected to the output terminal of the adder 54. The quotient available at the output terminal Q of the circuit 56 is fed, after demodulation by the synchronous demodulator 26, to a position indicator 27.

In modifications (hereinafter referred to as reciprocal versions) of the detectors illustrated in FIGS. 1, 4 and 5 the transmitting coils 1 and 2 or 30, 31 or 50 of the detectors are connected as detecting coils and the detecting coils 6, 7 or 51, 52 are driven as transmitting coils. Thus when the detector has two transmitting coils 6 and 7 or 51 and 52, each is energised to transmit a primary field having a different frequency or phase; in this manner, it is possible to separate (in the signals picked up by the detecting coil or coils 1, 2 or 30, 31 or 50) the signal originating in the transmitter 6 or 51 from that orignating in the other transmitter 7 or 52. This separation is obtained by using frequency selective amplifiers or phase separators, as the case may be.

These reciprocal versions are located in an optimum tracking position when the arrangement with respect to the pipeline 4, of the elements 1, 2, 6, 7 (FIG. 1) or 30, 31, 6, 7 (FIG. 4) or 50, 51, 52 (FIG. 5) is identical to that shown in FIGS. 1, 4 and 5.

Figure 7:
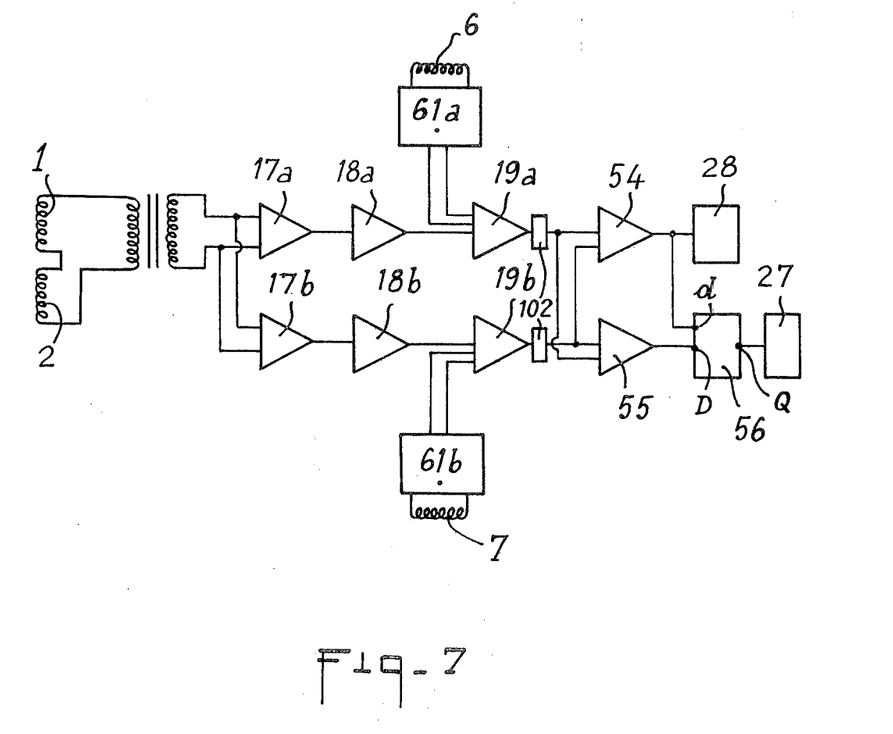
FIG. 7 is a block diagram of yet another form of detector embodying the invention.

The circuit for the reciprocal version of the FIG. 1 detector is shown in FIG. 7. As shown in FIG. 7 the coils 1 and 2 are electrically coupled in series so that their signals augment one another. As each transmitting coil 6 and 7 transmits a primary field at its own frequency, the complex measurement signal generated by the series-coupled coils 1 and 2 is coupled in parallel via a coupling transformer to the input terminals of two pre-amplifiers 17a, 17b. The output of each pre-amplifier 17a and 17b is fed to the input terminals of a respective one of two selective amplifiers 18a, 18b; each amplifier being tuned to a respective one of the transmission frequencies of the transmitters 6 and 7. The signals emerging from the amplifiers 18a, 18b are processed in an analogous manner to that of those issuing from the amplifiers having the same reference of FIG. 6, except that the reference signals fed to the addition circuits 19a, 19b originate from respective reference devices 61a and 61b supplying the coils 6 and 7 with different frequencies. With the signals issuing from the circuits 19a, 19b being of different frequencies, a synchronous demodulator (not shown) is installed at the outlet side of each of these circuits.

In the case of the reciprocal versions of the detectors of FIGS. 4 and 5, it is possible to use a circuit similar to that of FIG. 7. In this case the coils 1 and 2 of FIG. 7 are replaced by the single receiving coils 31 and 50 respectively and the transmitting coils 6 and 7 are replaced by the coils 51 abd 52.

In another reciprocal version of the FIG. 1 detector, the assembly of the transmitting and receiving coils is pivoted through 90° around its central vertical axis with respect to the pipeline 4. This results in a device similar to that of FIG. 5. In this case, the transmitters 6 and 7 need not each be supplied at a different frequency or phase.

In all versions of the detector the transmitting and detecting coils are all secured to a rigid framework 60. In all versions there are two principal points on the framework 60 from which distances to the pipeline are determined. In the versions described initially in FIGS. 1 and 4, these are the fixed points A and B which constitute the centers of the detecting coils 6 and 7 or 51 and 52. In the case of reciprocal versions, these points are the median points (that is to say the points situated half-way between the two transmitting poles 6a, 6b and 7a, 7b or 51a and 52a,52b) of each detector.

In the case of the detectors of FIGS. 1, 4 and 5 operating as initially described, there are two principal measuring devices for making the two measurements. These devices comprise common transmission coils 1 and 2 or 30 and 31 or 50 and their respective detecting coils 6, 7 or 51, 52.

In the case of FIGS. 1 and 4, there is a third measuring device 1, 2, 8 or 30, 31, 8 having transmission coils in common with those of the first two devices and a detector coil 8. This third measuring device forms an auxiliary measuring device rendering it possible to measure the distance between the metal object 4 and a third fixed point C which is the center of the coil 8 and lies mid-way between the points A and B.

In all cases, the signals delivered by the two measuring devices are subtracted from each other and the "difference" signal thus obtained is divided by an auxiliary signal representative of the intensity of the secondary magnetic field at a point situated between the points A and B. In accordance with the examples of FIGS. 1 to 4, this auxiliary signal is that provided by the third measuring device 1, 2, 8 or 30, 31, 8. In the case of FIGS. 5 and 6, this auxiliary signal consists of the sum of the signals delivered by the two measuring devices 50, 51 and 50, 52.

It will be appreciated that the detector can be mounted on a land or underwater vehicle to steer the vehicle so that it follows a buried pipeline. This enables inspection and maintenance of the pipeline to be achieved. This detector will indicate the height of the vehicle above the pipeline and also the deviation between the path followed by the vehicle and that of the pipeline.

Other applications of the described detector are envisaged in connection with the inspection and maintenance of underwater cables or in connection with the positioning of metal objects with respect to a structure.

Figure 2:
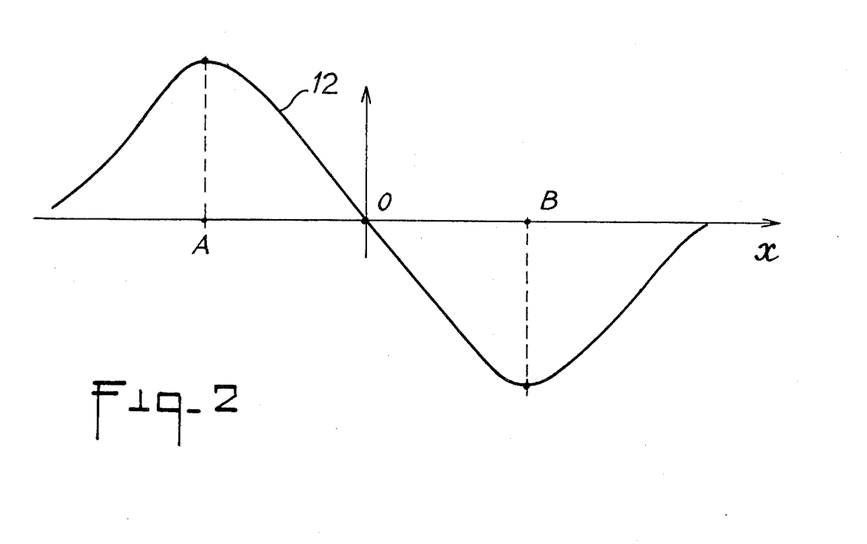
FIG. 2 is a graph of the signal supplied by the detector of FIG. 1 as a function of the lateral drift of the detector with respect to the axis of the pipeline.

The processing circuit 20 and the dividing circuit 56 described can advantageously be replaced by a digital or analog computer designed or programmed in such manner as to deliver a signal $f(\Delta,A)$ which is simultaneously a function of the amplitude ($\Delta$) of the differential signal 12 and of the amplitude (A) of the auxiliary signal which is representative of the intensity of the secondary magnetic field at a point situated between the two reference points. This function $f(\Delta,A)$ differs from ($\Delta/A$) because it is selected in such manner as to establish as precise a measurement as possible of the distance x (see FIG. 2).

For example, the function of $f$ may be of the type:

$$C_o \frac{\Delta}{A} + \frac{C_1}{A^2} + \frac{C_2}{A^3} + \ldots + \frac{C_n}{A^n},$$

in which $C_o, C_1, C_2 \ldots C_n$ are constants which can be determined by calibration.

The depth signal fed to the indicator 28 is advantageously provided by a calculator receiving the auxiliary and differential signals. This calculator is designed or programmed in such manner as to provide a function $g(\Delta,A)$ selected in such manner as to establish as precise a measurement as possible of the distance between the device and the metal object.

For example, such a function $g$ may be of the type:

$$g(\Delta,A) = D_o A^p + D_1 A^q \Delta^2,$$

$D_o, D_1$, $p$ and $q$ being constants selected appropriately, which can be determined by calibration.

I claim:
1. A metal detector, comprising
   a framework having two spaced reference points,
   first and second measuring devices mounted on the framework and each arranged to sense the distance between a metal object to be detected and a corresponding one of the two reference points, each measuring device comprising
   a transmitter having at least two substantially coplanar pole faces of opposite magnetic polarities for generating an alternating primary magnetic field to couple the metal object to be detected, and
   a receiver including at least one detecting coil having a longitudinal axis which extends parallel to the common plane containing the said two pole faces, the detecting coil being coupled by a secondary magnetic field generated by eddy currents induced in the metal object by the primary magnetic field to produce an output signal indicative of the magnitude of the field detected, and
   processing means comprising
      a subtractor coupled to receive the output signal of each receiver and to produce a difference signal indicative of a deviation of the detector from the metal object, and
      means providing an auxiliary signal representative of the magnitude of the secondary magnetic field at a point intermediate the two reference points.

2. A detector according to claim 1, wherein the processing means includes combining means coupled to receive the auxiliary signal and the difference signal and to process them in such a manner as to provide at least two indicating signals each of which is simultaneously a function of the difference signal and of the said auxiliary signal, these signals being indicative of the position of the detector with respect to the metal object.

3. A detector according to claim 2, wherein the combining means comprises multiplying means to multiply the difference signal by the reciporcal of the auxiliary signal.

4. A detector according to claim 1 wherein the auxiliary signal providing means comprises an adder coupled to receive the two output signals and to sum said two output signals to produce said auxiliary signal.

5. A detector according to claim 1, wherein the auxiliary signal providing means comprises an auxiliary measuring device mounted on the frame to sense the secondary field at a point mid-way between the two reference points and to provide said auxiliary signal in dependence thereon.

6. A detector according to claim 1, wherein the first and second measuring devices have a common transmitter or a common receiver.

7. A detector according to claim 1 wherein the first and second measuring devices together comprise first and second components, the first component including one coil and the second component including at least two coils each having a longitudinal axis extending orthogonally in relation to that of the coil of the first component, one of said components forming a said transmitter and the other forming a said receiver.

8. A detector according to claim 1, wherein the detecting coil of each receiver is so located that its center coincides substantially with the corresponding reference point.

9. A detector according to claim 1, wherein the two pole faces of each measuring device are located on opposite sides of and equidistant from a corresponding reference point, and wherein the primary field generated by the first measuring device differs in frequency or in phase from that of the second measuring device.

10. A detector according to claim 1, wherein the centers of the two pole faces and the centers of the detecting coils of the two receivers are located at the four corners of an imaginary square.

11. A detector according to claim 7, wherein the centers of the coils of the first and second components are substantially coplanar.

12. A detector according to claim 7, wherein the centers of the coils of the first and second components lie along a common axis.

13. A detector according to claim 2, wherein the combining means comprises a variable-gain amplifier coupled to receive the auxiliary signal, and variable reference means operative to set the gain of the amplifier to a constant level.

14. A metal detector comprising
a frame,
magnetic transmitter means mounted on the frame and having two coplanar pole faces of opposite polarity for generating an alternating magnetic field arranged to couple a metal object to be detected,
first, second and third detecting coils mounted on the frame and having longitudinal axes located in a common plane extending parallel to the plane common to the two pole faces, the axes of the first and second detecting coils lying parallel to, equidistant from and on opposite sides of the axis of the third coil, the centers of the three coils lying along a common axis which extends at right angles to the axis common to the centers of the two pole faces, the three coils being arranged to sense magnetic fields produced by eddy currents induced in the metal object by the magnetic transmitter means,
means coupling the first and second coils in series-opposition to provide an output signal indicative of any misalignment between the detector and the metal object being detected,
means for receiving the output of the third coil, which output is indicative of the distance of the detector from the object, and for modifying the said output signal substantially to remove from it the component which varies with distance of the detector from the metal object, the modified output signal thereby being directly proportional to the deviation of the detector from the metal object along the axis common to the centers of the detecting coils.

* * * * *